April 10, 1928.  
W. E. WINE  
TRACTION WHEEL  
Filed March 14, 1925  
1,666,036  
2 Sheets-Sheet 1

Inventor:  
William E. Wine  
By: Wm. O. Bell, Atty.

April 10, 1928.

W. E. WINE

TRACTION WHEEL

Filed March 14, 1925

Inventor:
William E. Wine
By: Wm. O. Belt
Atty.

Patented Apr. 10, 1928.

1,666,036

UNITED STATES PATENT OFFICE.

WILLIAM E. WINE, OF TOLEDO, OHIO, ASSIGNOR TO THE TRACTOR GRIP WHEEL COMPANY, OF TOLEDO, OHIO, A CORPORATION OF OHIO.

TRACTION WHEEL.

Application filed March 14, 1925. Serial No. 15,503.

This invention relates to a novel and improved traction wheel of the type in which a plurality of traction shoes are mounted upon the periphery of the wheel rim and in which the wheel and shoes are provided with interengaging members to transmit the tractive effort from the shoes to the wheel. There are numerous wheels of this type, most of which have teeth projecting from the periphery of the rim and received within openings in the shoes. These teeth are usually made detachable so that the wheel may be used either with the shoes in soft ground, or without the shoes and teeth on a hard road, or the like. These teeth must be fastened to the rim in such a way as to provide for the taking up of the shear between the tooth and the rim and moreover they disturb the dirt beneath the traction shoe, thereby decreasing the traction obtained by the engagement of the shoe with the dirt or other material.

It is, therefore, one of the principal objects of my invention to provide a traction wheel which shall increase the traction by avoiding the use of a tooth projecting beyond the periphery of the rim.

A further object of my invention is to provide a traction wheel in which there is no separate tooth provided, thereby avoiding the necessity for providing means to take up the shear on the bolt or the like, usually employed to fasten such a tooth to the rim.

A still further object of my invention is to provide a traction wheel in which the number of parts and the size of the shoes may be reduced to a minimum and which shall be economical in manufacturing and efficient in assembling and in operation.

In the accompanying drawings in which I have shown a selected embodiment of my invention:

Figure 1:
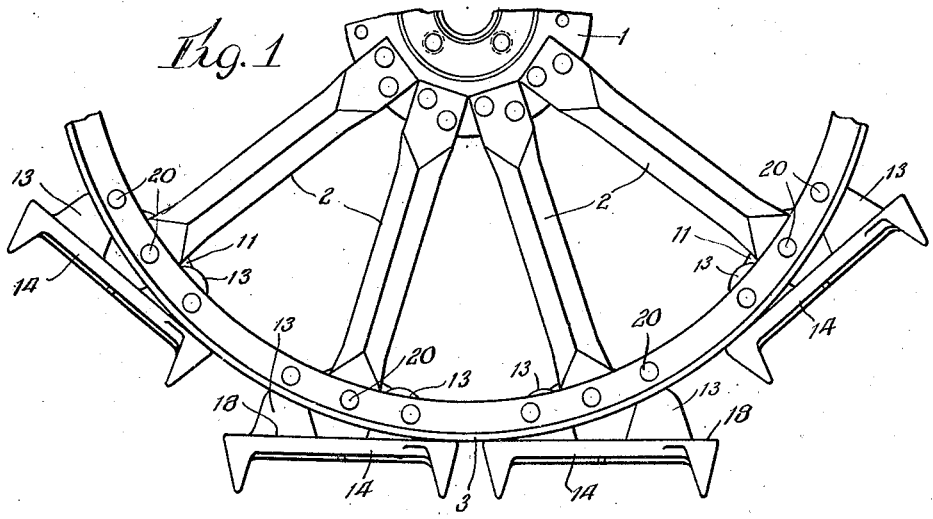
Fig. 1 is an elevation of a portion of a wheel having my invention embodied therein.
Figure 2:
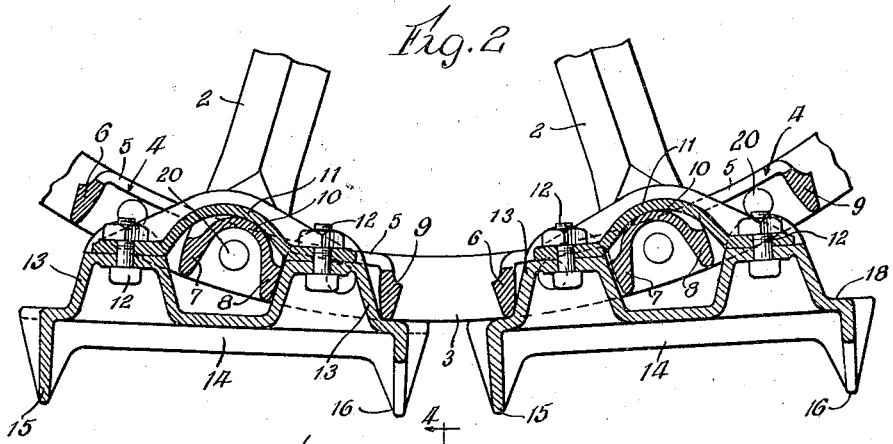
Fig. 2 is a longitudinal section on an enlarged scale of a portion of a structure shown in Fig. 1, taken on a plane normal to the axis of a wheel.
Figure 3:
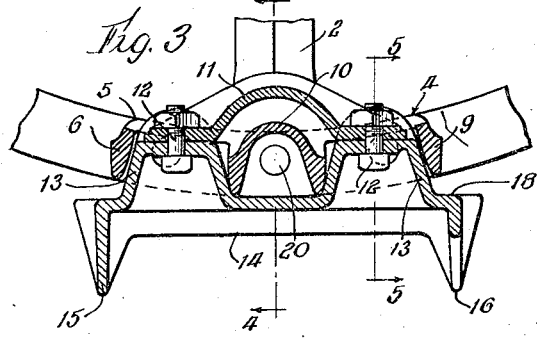
Fig. 3 is a section taken on the same plane as that of Fig. 2, but showing one of the shoes in a different position.

Referring now to the drawings, numeral 1 designates a hub of any suitable construction to which are attached the spokes 2 secured at their ends to a pair of rings 3, preferably formed of angle bars bent to the desired configuration. These rings are spaced apart by a plurality of spacer members 4, said members comprising sides 5 extending along and secured to the rings 3 and connected by a plurality of transverse teeth 6, 7, 8 and 9.

The spaces between the teeth 6 and 7 and the teeth 8 and 9 respectively are open for a purpose which will presently appear, but the space between the teeth 7 and 8 is closed by an arch shaped member 10 which connects the teeth 7 and 8 and with those members forms a transverse bar with which is engaged the holder 11 secured at its ends by bolts 12 to teeth 13 on a traction shoe 14. The traction shoe is provided with a plurality of transverse ground engaging bars 15 and 16. These bars may be arranged as desired, but I have shown them as of the form shown and described in my co-pending application Serial No. 10,722 filed February 21, 1925, the bar 15 extending entirely across the shoe from edge to edge and the bars 16 extending outwardly beyond the edges and terminating at the longitudinally extending reinforcing ribs 17. By this arrangement there is provided an undisturbed column of dirt or other material between the central portion of the bar 15 and the central portion of the same bar on the next adjacent shoe. This column, it is evident, will not be disturbed by any tooth projecting from the rim and between the bars 15 on adjacent shoes, the engagement between the rim and the shoe being furnished by the tooth members on the spacer member, which are received within the periphery of the rim and the teeth 13 on the shoe, which projects inwardly from the track sections 18 on the shoe.

The teeth 13 are preferably made integral with the shoe so that they may be made in one casting and have a corresponding strength. The spacer member with its teeth is also preferably cast in one piece and therefore it will be seen that the number of parts has been reduced to a minimum, the only additional parts required being the holder 11, and the bolts or the like, for fastening the holder to the teeth. It will be noted that the bolts are not required to take any substantial amount of shear because of the fact that the teeth 13 are integral with the shoe. Nevertheless the holder ties the teeth together so that they act in unison to distribute any excess of shear from one to the other, but this shear which is transmitted to the bolts, is relatively small compared to that which has to be borne by a bolt securing a tooth in position.

Figure 4:
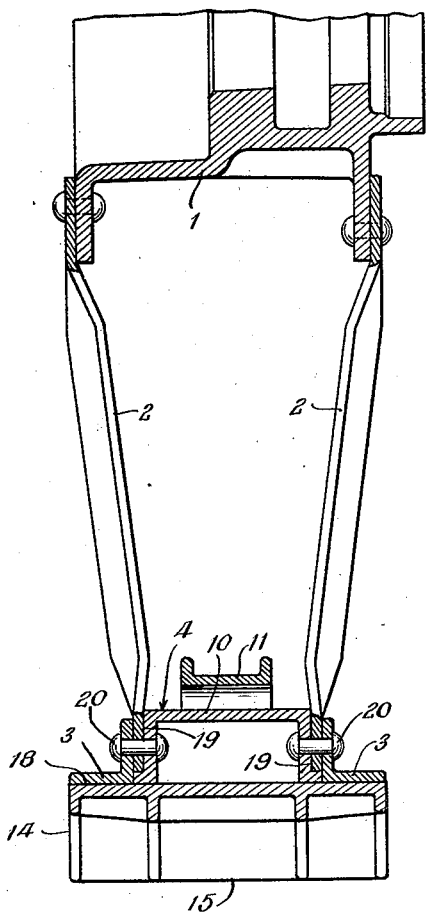
Fig. 4 is a section on the line 4—4 of Fig. 3, and including a portion of the hub.
Figure 5:
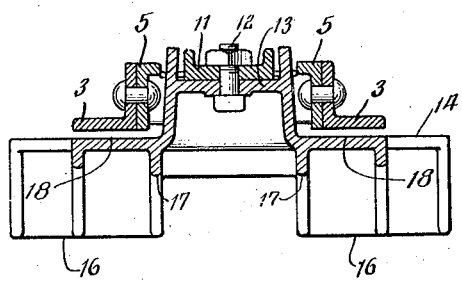
Fig. 5 is a section on the line 5—5 of Fig. 3.
Figure 6:
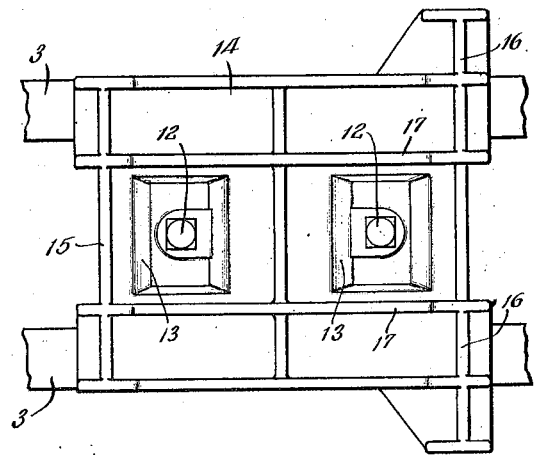
Fig. 6 is a bottom plan view of Fig. 3.

Referring now particularly to Fig. 4 it will be seen that the spacer member 4 is recessed on either side as at 19 to receive the ends of the spokes 2 between the spacer member and the rings 3. The ends of the spokes contact with the bottoms of the recesses 19 and fit snugly within the recesses thereby relieving the rivets 20 of stress due to torque. The rivets 20 are provided to secure the spacer members to the rings, but the rivets passing through the spokes are practically unnecessary to transmit stress to the spokes. By providing the arched member 11 connecting the teeth 7 and 8, I provide what is in effect one hollow tooth which makes it much easier to insert the rivets 20 at this point, than if the tooth were solid throughout its length. Moreover, the length of rivets and the amount of material in the tooth is cut down materially without sacrificing strength in any way.

From the above it will be apparent that I have provided a novel and improved traction wheel in which the number of parts has been materially reduced without affecting the efficiency of operation and which, in fact, increases the efficiency of operation. By increasing the traction, the size of the shoe may be reduced in proportion, thus effecting a substantial economy.

I am aware that changes in the form, construction and arrangement of parts may be made without departing from the spirit and without sacrificing the advantages of the invention and I reserve the right to make all such changes as fairly fall within the scope of the following claims.

I claim:

1. A traction wheel comprising a rim, a plurality of transversely extending teeth on said rim and within the periphery thereof, a traction shoe having a plurality of transversely extending spaced teeth adapted to be received between the teeth on said rim, and a holder secured to two teeth on said shoe and loosely held on said rim.

2. A traction shoe comprising integral track sections and a plurality of inwardly extending teeth, a wheel rim adapted to engage said sections and having a plurality of teeth within the periphery thereof and adapted to co-operate with the teeth on said shoe, and an arch shaped holder secured to two teeth on said shoe and loosely held on said rim.

3. A traction wheel comprising a shoe having integral track sections, a pair of teeth projecting inwardly from said track sections and integral with said shoe, a holder connecting the inner ends of said teeth, a rim, and a transverse bar on said rim loosely engaging said holder.

4. A traction wheel comprising a rim formed of spaced rings, spacer members between said rings and comprising a plurality of transverse teeth, two of said teeth being connected together by an arch shaped member to form a transverse bar, the spaces between the other teeth being left open, a shoe having teeth received within said openings, and a holder secured to the teeth on said shoe and loosely engaging said bar.

WILLIAM E. WINE.